United States Patent [19]
Echerer et al.

[11] Patent Number: 5,272,760
[45] Date of Patent: Dec. 21, 1993

[54] RADIOGRAPHIC IMAGE EVALUATION APPARATUS AND METHOD

[75] Inventors: Scott J. Echerer, Cayce; Mike A. Sutton, Irmo; Stephen R. McNeill, Columbia; Philip J. Titone; Max E. Collins, both of West Columbia, all of S.C.

[73] Assignee: Cimpiter Corporation, Cayce, S.C.

[21] Appl. No.: 891,406

[22] Filed: May 29, 1992

[51] Int. Cl.$^5$ ............................................. G06K 9/00
[52] U.S. Cl. ................................... 382/6; 364/413.22; 382/54
[58] Field of Search ..................... 382/6, 54, 48, 51; 364/413.13, 413.22, 413.19

[56] References Cited

U.S. PATENT DOCUMENTS

| | | |
|---|---|---|
| 4,189,775 | 2/1980 | Inouye et al. ............................ 382/6 |
| 4,641,242 | 2/1987 | Kimura ..................................... 382/6 |
| 4,920,491 | 4/1990 | Eberhard et al. ....................... 382/6 |
| 5,046,118 | 9/1991 | Ajewole et al. ......................... 382/6 |
| 5,048,110 | 9/1991 | Nakajima ................................. 382/54 |
| 5,150,421 | 9/1992 | Morishita et al. ...................... 382/6 |
| 5,172,418 | 12/1992 | Ito et al. ......................... 364/413.13 |
| 5,172,419 | 12/1992 | Manian .................................... 382/6 |
| 5,179,597 | 1/1993 | Takeo ..................................... 382/48 |

Primary Examiner—Joseph Mancuso
Attorney, Agent, or Firm—Michael A. Mann; Maria Reichmanis

[57] ABSTRACT

Apparatus and method for evaluating a radiograph, such as an X-ray being diagnosed for chiropractic treatment. The apparatus includes a scanner, a monitor, a central processing unit, user interface equipment, a laser printer and a modem. The X-ray is scanned by the scanner that generates a series of binary values for each segment of the X-ray and representing the relative transparency of each segment. The CPU receives the binary values and constructs a bitmap corresponding to the X-ray image for display on the monitor. Then the CPU enables the user to enhance the image on the monitor to assist in extracting information related to the analysis, diagnosis and prognosis of the condition indicated by the features of the X-ray. Enhancements include increasing brightness, contrast, edge detection and histogrammic equalization. The enhanced image can be used to determine relationships among the features by their separation distance and orientation with respect to each other. The apparatus generates reports and stores the image and information extracted therefrom.

5 Claims, 4 Drawing Sheets

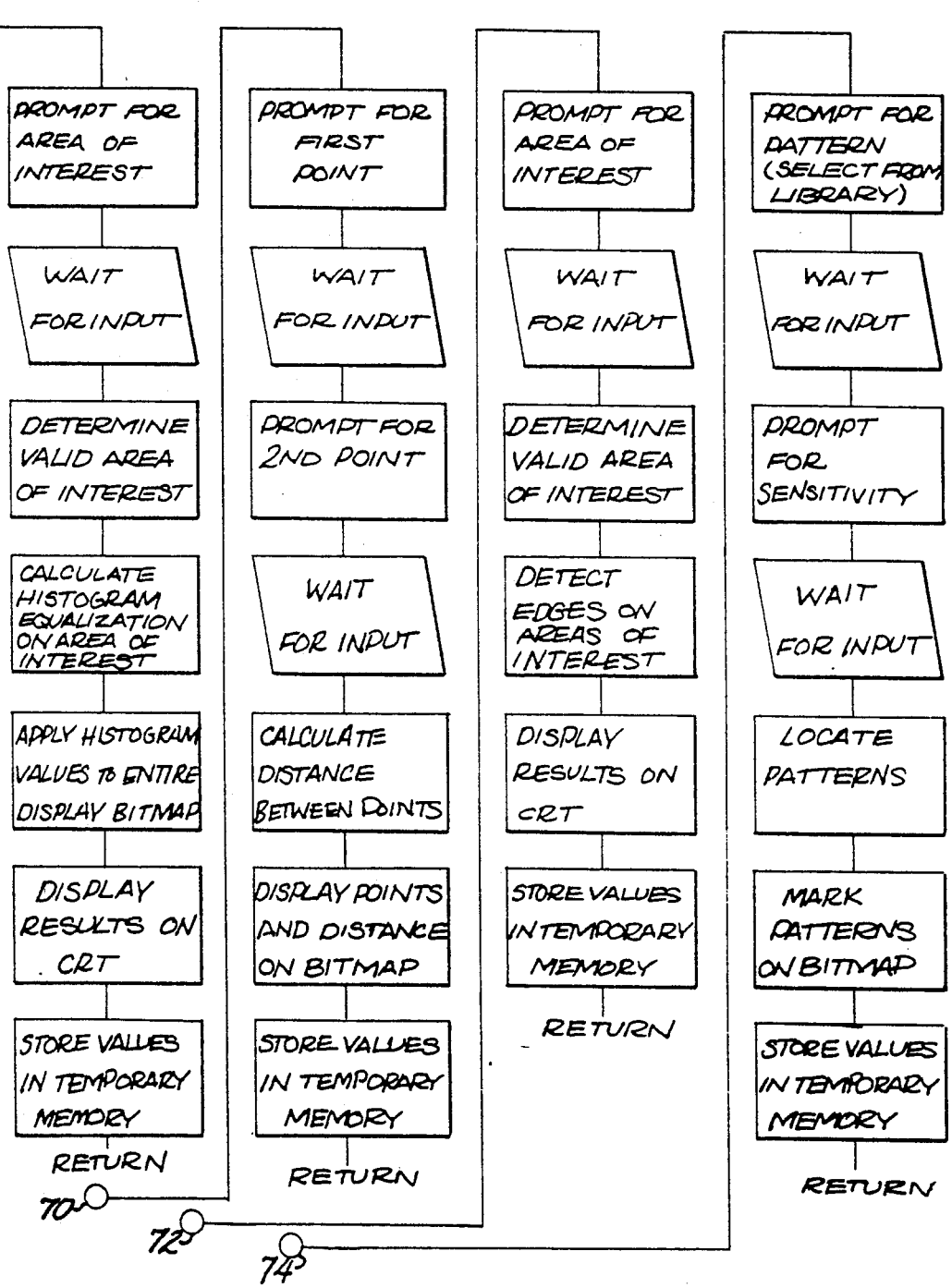

RADIOGRAPHIC IMAGE EVALUATION APPARATUS AND METHOD

BACKGROUND OF THE INVENTION

1. Field of the Invention:

The present invention relates to the evaluation of radiographic images. More particularly, the present invention relates to creation of X-ray images from X-ray radiographs, processing these X-ray images, and image storage.

2. Discussion of Background:

A radiographic image is a photograph made with visible or infrared light, including X-ray photographs, thermographs or any radiographs made using forms of penetrating or reflected radiation directed through or reflected from a body or object having features, internal or external, not readily discernible from the exterior. The purpose of radiographic photography is to ascertain information about the features of or within that body. Examples of the types of features shown in radiographic photographs such as dental, chiropractic, orthopedic and industrial X-rays include bone, vertebrae and tooth structure, and weldments. A radiograph is evaluated by using it to extract information about such features for analysis, diagnosis, prognosis, or certification. Typically, an X-ray is evaluated by drawing lines on it with a pencil and ruler to determine the relationships among the various features it contains.

X-ray and other radiation sources have been in widespread use in a variety of medical and industrial applications for creating images on photographic film. In the past few years, several apparatuses have been developed for creating an image of the X-ray film so that they may be displayed on a cathode ray tube (CRT). Typically, the X-ray is scanned to produce an analog, serial signal that is fed to the CRT for display through a television-type raster pattern. The image may be processed to improve brightness and contrast; it may be placed side-by-side with another image, such as a patient's previous X-ray or an X-ray of a weld joint of known quality, for visual comparison.

Recent examples of X-ray or radiation evaluation or diagnostic apparatus are found in U.S. Pat. No. 5,086,392 issued to Nakajima, in U.S. Pat. No. 5,077,768 issued to Shigyo, et al, and in U.S. Pat. No. 5,038,369 issued to Nishiki. Nakajima's device scans and compares two images in the diagnosis of radiographs. Shigyo, et al. read and process radiographs, looking for and responding to detected faults in the image. Nishiki's apparatus relates to forming a better CRT image by removing the off-set signal that occurs when no radiation is being received from the signal when the radiation signal is being received.

However, there remains a need for a system for evaluating radiographs that is useful to dentists, chiropractors and other medical and industrial professionals for relatively routine X-ray photographs depicting the orientation of bones, teeth, internal characteristics of welds, and other distinct features where geometric considerations important to the evaluation of the X-ray can be handled automatically.

SUMMARY OF THE INVENTION

According to its major aspects and broadly stated, the present invention is a method and apparatus for evaluating radiographic images. The apparatus comprises, in a preferred embodiment, (1) a scanner for reading a radiograph and generating a series of binary-coded values that represent the relative transparency or brightness of each segment of the photograph, (2) a central processing unit for, among other things, creating a CRT-displayable image from the series of binary-coded values, (3) a high resolution monitor for displaying the image, (4) memory capability for storing the image, enhancements to the image, reference images and patterns useful in image processing, and (5) peripheral devices such as printers, modems and user interface devices for direction and control of the system and for transferring input to and output from the system.

In the method, the radiograph is defined as being made up of a matrix of segments which are scanned in order to derive a series of binary values representing the relative transparency or brightness of each portion or segment of the photograph. The series of binary values is converted to a bitmap for producing a CRT (cathode ray tube)-displayable image by assigning each binary value to a pixel of the CRT and decoding the value to produce an analog value of relative intensity for that pixel. This image is a replica of the radiograph and, together with identification information affixed to it, is stored in memory. Changes to the stored bitmap image are inhibited in order to preserve the integrity of the map. The image may then be enhanced by increasing the brightness and contrast to make the features more discernible. These enhancements are stored separately from the unenhanced image.

The enhanced image is displayed on a CRT that is preferably a monitor having as high a number of pixels per line and as high a number of lines as is economically available, a so-called "high resolution" monitor, but at least one having more than 1000 pixels per line and 1000 lines. The individual features of the image, are marked to highlight them. The boundaries or edges of features may be detected by using algorithms to find the "edge" of the feature and "marking" it with a "point" on the CRT monitor. Points are connected to form lines; angles between intersecting lines and distances between points can be calculated. In these efforts, the user is assisted by prompting and by mathematical calculations from the CPU to the extend desired. In addition to calculating angles and distances, the CPU stores reference images and patterns for comparison to the particular image scanned in and pathways for routine diagnoses. Further, if desired, a portion of that image displayed can be selected for expansion, or "zooming-in," for display over the full monitor screen. The results of the evaluation are stored and, together with a copy of the enhanced image, can be printed in the form of a report.

There are several important, individual features of the present invention. However, all the elements of the invention combine to provide a system for evaluating radiographic images that can serve as powerful tool for medical and industrial professionals. The system produces high-quality, accurate images of the features of an image for record-keeping, evaluation and report preparation. These images are reproducible and may be transmitted over telephone lines via a modem. The image may be incorporated into a report along with the results of calculations done using the image. These types of reports are useful as a matter of good practice for health care professionals and are also useful in legal defense, insurance reimbursement justification and in patient education.

The preparation of the bitmap is an important feature of the present invention. The bitmap is a correspondence of the binary value of each segment of the original photograph and each pixel on the CRT. Each value relates to the relative transparency of the original radiation photograph. In a preferred embodiment, over 200 shades of gray can be used to represent the X-ray photograph, many more than the 65 shades detectable by the human eye. Therefore, subtleties can be highlighted that might otherwise go completely undetected.

The enhancement techniques are another important feature of the present invention. In addition to increasing brightness and contrast, there is a histogram equalization module that allows portions of the image to be selected and other portions, those with areas that are substantially and uniformly transparent or opaque, and lacking in features or useful information to be disregarded, in determining relative transparency. The deselected portion would otherwise bias the assignment of the gray scale when performing enhancements. By selecting only the portion of interest, the gray scale can be applied so as to enhance the existing information and make features more readily discernible.

CPU assistance in the evaluation of the image is another important feature of the present invention. As described above, there are CPU based tools for identifying and marking features of the image and making certain calculations related to the image and for prompting these calculations for routine diagnostic paths. In addition to convenience and speed in the evaluation, this feature performs the particular functions desired in a more repeatable, objective, accurate manner and eliminates common sources of error.

Another feature of the present invention is the separate storage of enhancements and the unenhanced binary values. Further, the values are stored in such a way that changes to the values are inhibited to preserve their integrity.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIGS. 3a, 3b, and 3c show parts of a flow chart of the processing of an image according to a preferred embodiment of the present invention.

DETAILED DESCRIPTION OF A PREFERRED EMBODIMENT

The present invention is an apparatus and a method that is interposed between a radiograph and a user who wants to extract information from that radiograph. The apparatus helps to extract that information by creating an accurate image or replica from the radiograph and performing certain operations on it to enhance it and to analyze it so that the information it contains can be readily discerned, diagnosed and, in general, evaluated by the user.

A radiograph includes an X-ray or transparency, a photographic negative or positive, a gamma scan and any other image deposited in a fixed form onto a sheet of paper or polymer film and made by directing electromagnetic radiation onto and through a body or reflecting light from a body, with the transmitted or reflected radiation falling on a target or sensing device which makes a replica of the image. For penetrating radiation such as X-rays and gamma rays, the body is, preferably, one that has internal features not visible from the exterior but, through the use of penetrating radiation, can be made visible on the photograph. Furthermore, the radiograph contains an image having shades or relative degrees of transparency, ranging from completely transparent to completely opaque. Alternatively, if the photograph is not a transparency but, say, a photograph of reflected light, it will be appreciated that the photograph can have shades ranging from white to black or a full range of colors.

The present invention will be described in a preferred embodiment for use with chiropractic X-rays. However, it will be clear that the same method and apparatus, with some modifications readily performed by those of ordinary skill in their respective arts, can be applied to dental and orthopedic X-rays and weld X-rays and gamma scans, thermoscans, infrared scans and photographs, and many other types of radiographs.

Figure 1:
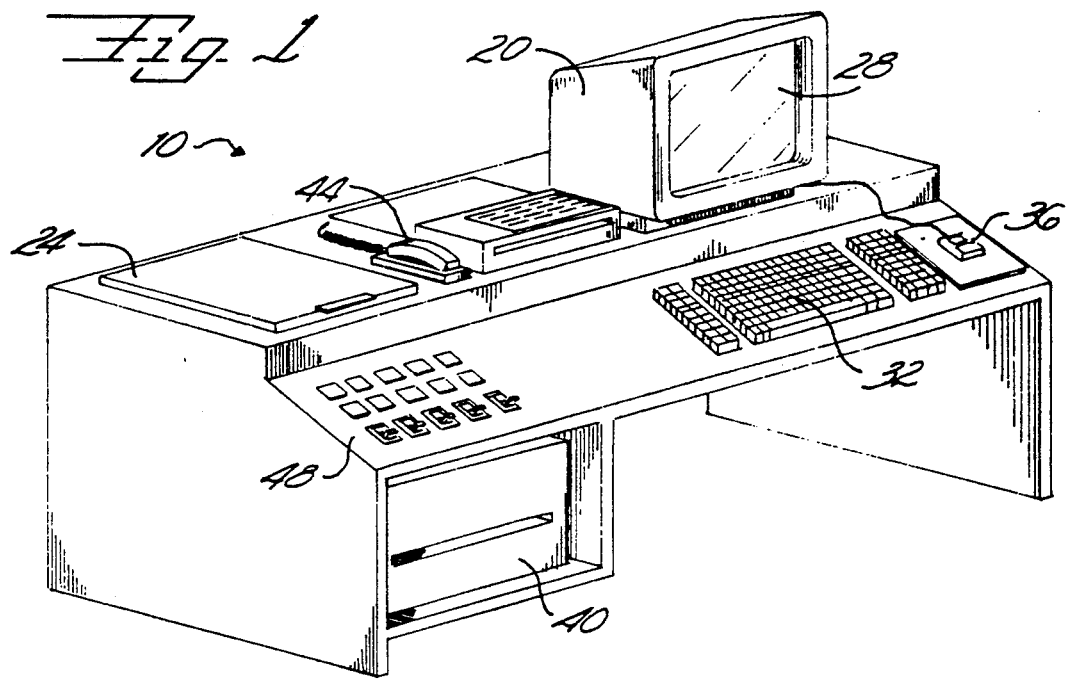
FIG. 1 is a schematic of an apparatus according to a preferred embodiment of the present invention.

Referring now to FIG. 1, there is illustrated schematically a preferred embodiment of the present invention, generally indicated by the reference numeral 10. Apparatus 10 comprises a set of components linked electronically and driven by a central processing unit (CPU) 20. Several of these components are specifically selected for the particular apparatus; the remainder are generic and in some cases optional.

A scanner 24 is provided as part of the apparatus that is capable of "reading in" the radiographic image. In particular, the scanner divides the photograph into a matrix of segments, determines the relative transparency or brightness of each segment, codes that segment's relative transparency into a binary value and places these values for the segments in a series for transmission to the CPU. The smaller the segments and the finer the gradations of transparency, the more information will be transmitted. Preferably, an eight-bit value will provide sufficient gradations for over 200 shades of "gray" (or, alternatively, over 200 colors), far more than the approximately 65 shades detectable by the human eye.

A correspondence is made between the number of segments assigned to each pixel of a monitor 28. Once the correspondence between segments and pixels is set, the number of segments per inch determines the size of the image on monitor 28. If the correspondence is one-to-one, one segment to one pixel, the image will be larger than if the correspondence is, say, four-to-one. The monitor should have at least 1000 pixels per horizontal line and 1000 lines for good resolution. However, a monitor with even more lines, preferably as many as technology and economics permits, is preferred.

The number of segments of scanner 24 is made to correspond to the number of pixels so that the image of the photograph can be mapped to the monitor screen by the creation of a bitmap. A bitmap is a correspondence of each segment to a location on the monitor. The value of the relative transparency on the gray scale is made to correspond to a relative intensity of light directed to the monitor screen. Since a number of sensors in the scanner (segments) per inch corresponds to a number of pixels per line, the more sensitive the scanner and the more pixels the monitor has, the more accurate the image produced.

Connected to CPU 20, typically co-located, is sufficient memory for storing data. Initially, the bitmap is stored in a first location. Moreover, programming in CPU 20 inhibits any changes to the bitmap in order to preserve its integrity. However, programming of CPU enables certain enhancements to be made to the bitmap but these are stored separately so that the enhanced and unenhanced bitmap can be displayed on monitor 28. A description of the enhancements possible will be presented below.

CPU 20 is connected to typical user interface devices: a keyboard 32 and a mouse 36, for example, or other devices that enable the user to direct the efforts of CPU 20 and respond to prompts programmed into CPU 20. For transmitting information into CPU 20 or from a CPU from another system, a printer 40 and a modem 44 are also provided. Printer 40 is preferably a high quality laser printer in order to print a high quality copy of the image as well as produce reports containing the evaluation of the radiograph and a copy of the image itself. Modem 44 might be used for sending or receiving a series of binary values of a radiation photograph or a report in communication with another user. Modem 44, printer 40, scanner 24 may be controlled by a control panel 48 on apparatus 10.

CPU 20 is also programmed for "dithering" an image output to printer 40. Dithering is a standard technique for converting a pixel characterized by a shade of gray to an arrangement of black dots produced by a printer that have roughly the same effect on a human eye as the shade of gray. The printer may be capable of, say, 300 dots per inch or, perhaps four or five dots per pixel horizontally and four or five vertically. Thus, a matrix of up to 16 to 25 black dots, in various arrangements can be used to represent a large number of shades. If every other location of this matrix has a dot, for example, the overall effect is a medium shade of gray. The printer is thus able to produce a reasonable facsimile of the radiographic image and CRT-displayable image.

Figure 2:
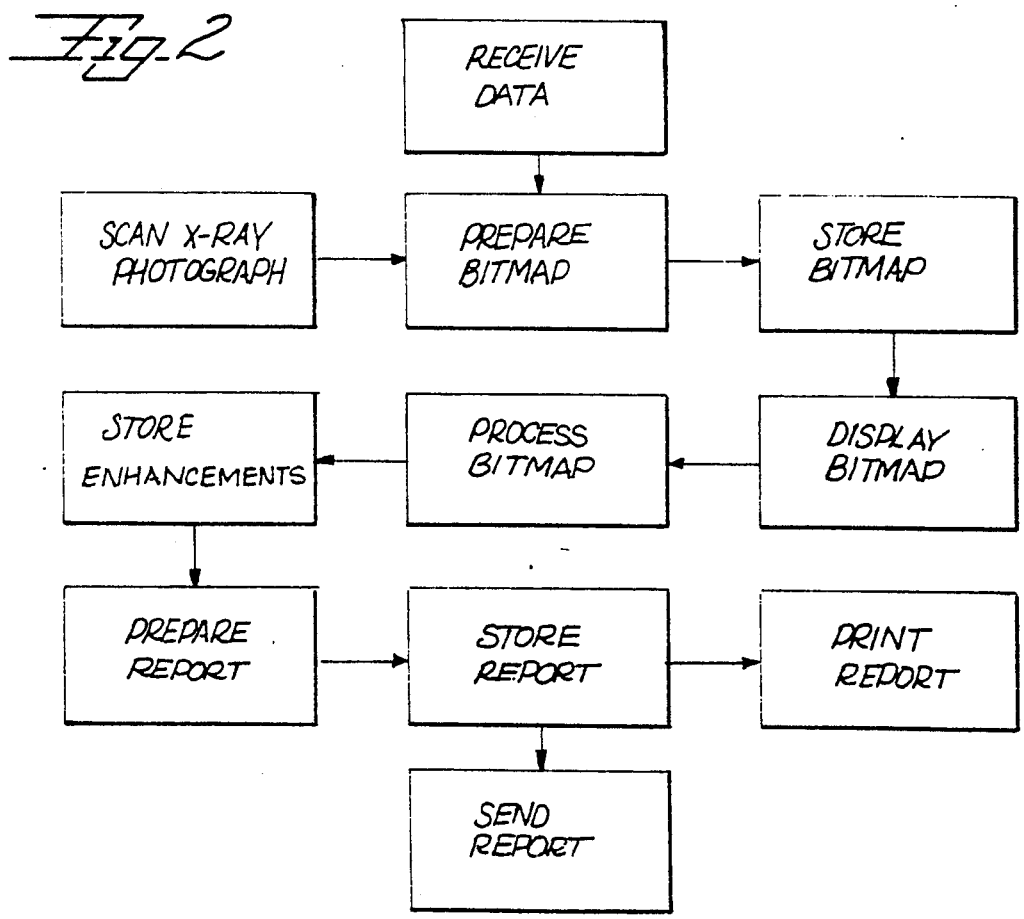
FIG. 2 is a flow chart of a method according to a preferred embodiment of the present invention.
Figure 3A:
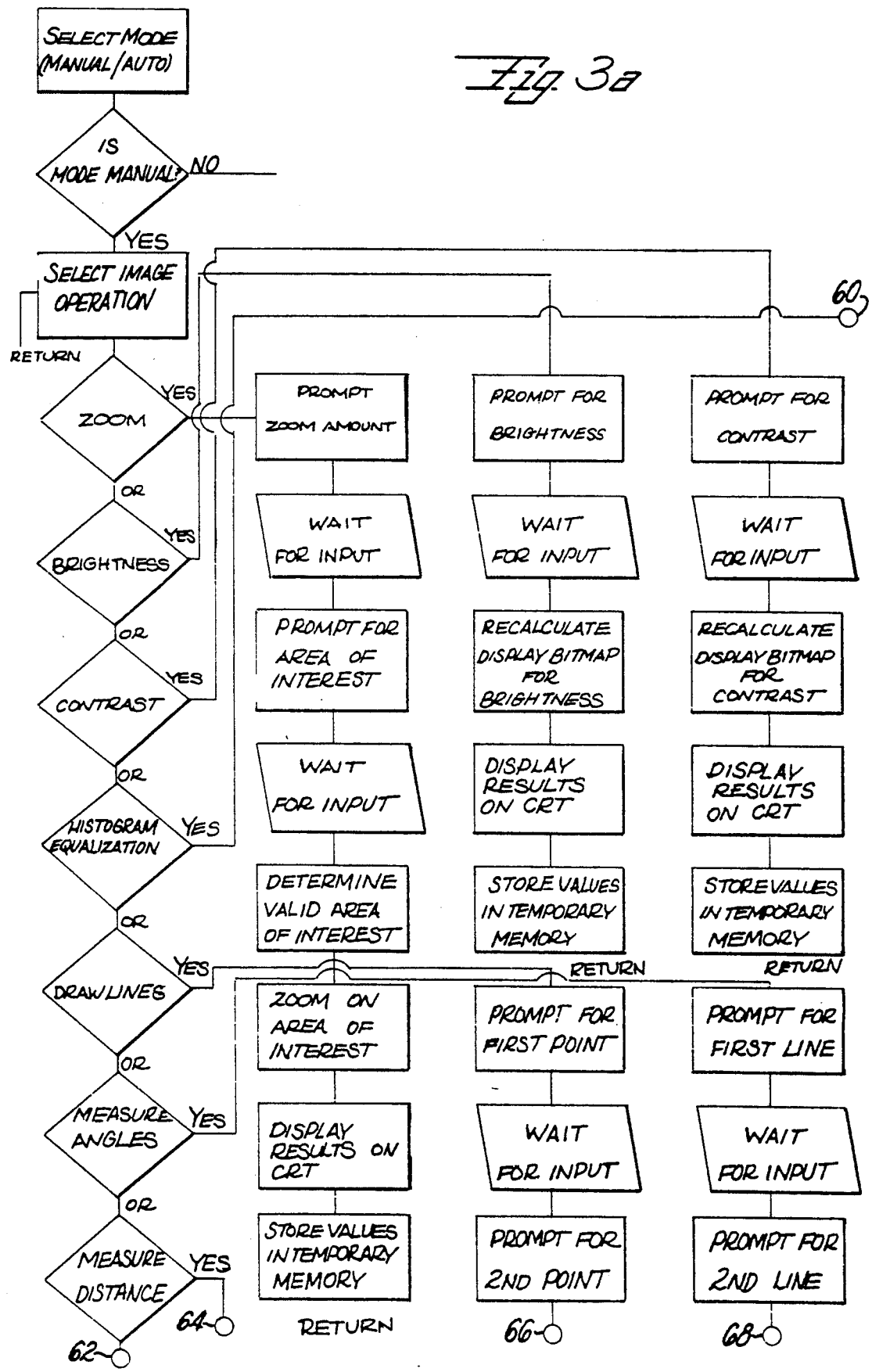
Figure 3B:
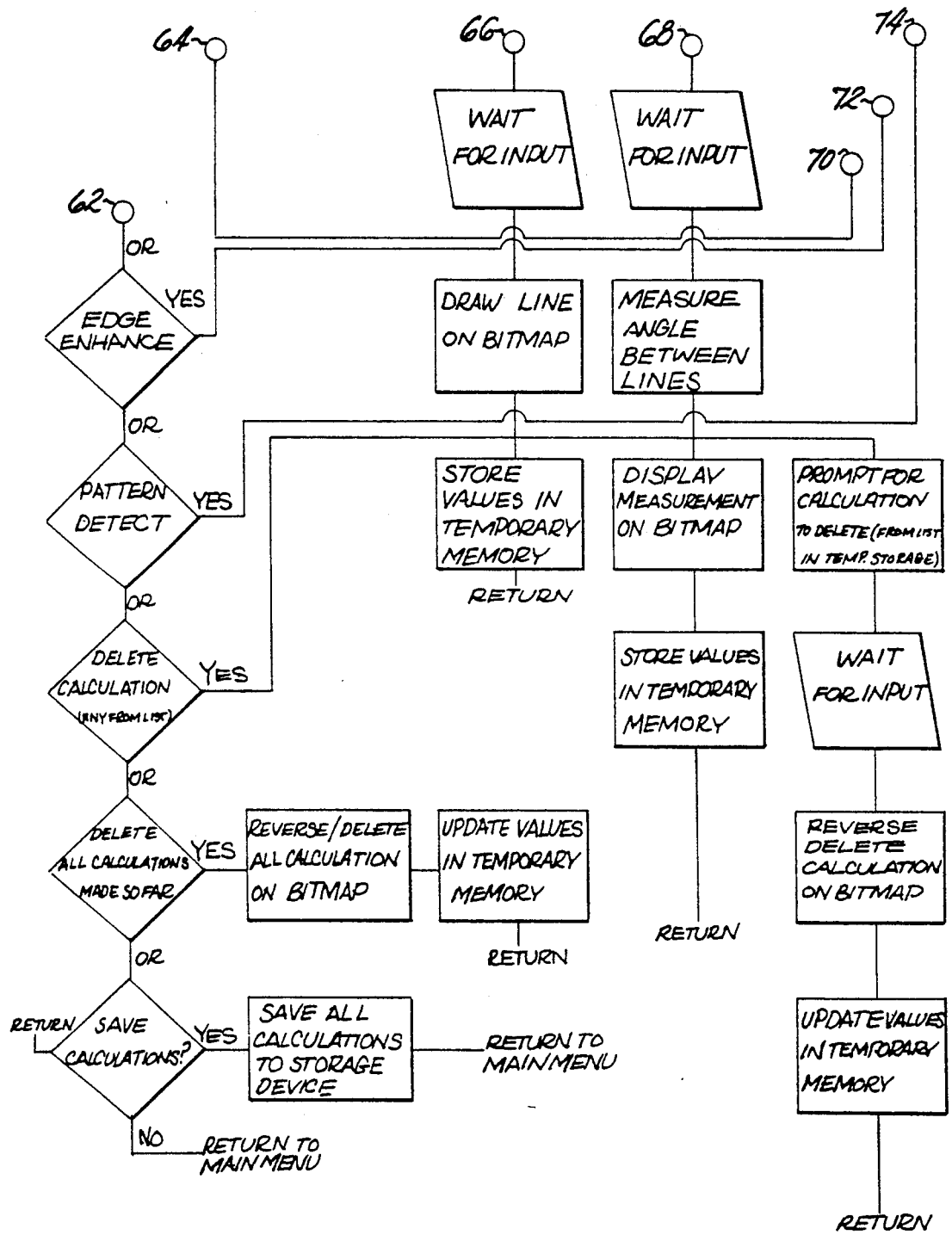

FIG. 2 depicts a flow chart of the overall method according to a preferred embodiment of the present invention. From either a scanner, a modem, or a disk on which an image has been stored, a series of binary values is received and converted to a bitmap. Identifying information is affixed to the received image. The affixed information includes: the patient's name and number, the name of the doctor assigned to the case, the doctor's identification number, the date of the X-ray, and perhaps the X-ray description. The bitmap is stored in such a way that changes are inhibited and then displayed on a high resolution monitor. The image displayed is processed in a manner to be described in more detail presently. However, the processing enhances the image displayed and extracts information from the image as a result of an interchange of instructions and responses between CPU and user. The enhancements and information are stored in a second memory location, separate from the bitmap. A report is prepared using the information and the image together with its enhancements and/or without them; the report is stored in a third memory location and also printed on the laser printer or possibly transmitted by modem to a remote user. FIGS. 3a, 3b, and 3c contain a flow chart of the processing of a radiograph in a preferred embodiment of the present invention. Where a single reference number identifies locations on more than one figure, those locations are the same and indicate a continuation of the chart from one figure to the next. Reference numbers 60, 62, 64, 66, 68, 70, 72, and 74 identify such continuations. When the user is a chiropractic professional, he or she may have stored in memory one or more reference X-rays for comparison to the one to be scanned into the CPU. A reference X-ray is an X-ray of a patient that illustrates the presence or absence of a condition, such as scoliosis. The reference will not have a patient's name associated with it but will simply serve as an example of a person with or without the condition for comparison to the X-ray of interest to help the medical professional determine if the condition is indicated by the X-ray of interest.

Also, there are certain standard analyses undertaken by chiropractors of X-ray images than are programmed so that the CPU undertakes to prompt the user for any input it needs to proceed with the analysis and input it may need along the radiographic image processing path. Furthermore, the CPU performs calculations related to distances between features of the spinal column, angles between features and alignments that can be compared to established, CPU-stored patterns and to reference X-rays. These include base lines, Cobb's angle, scoliosis, sacral angle, anterior/posterior stress lines, Atlas angle, curve angle, Furguson's angle, George's line, Jackson's angle, anterior curve, posterior curve, spondylo and stress lines, all of which are familiar to chiropractic professionals.

If the processing of the image is to be done in an automatic mode, the user needs to identify from menus (1) the content of the X-ray: cervical, thoracic, or lumbar; (2) the orientation of the X-ray: anterior/posterior or lateral; and (3) the type of injury using standard medical and insurance codes. However, in the manual mode, flexibility is provided when different body aspects are the subject of the X-ray and different views are shown. The aspect and view is entered to properly label the image that will appear in the report.

If the analysis is non-standard or if, for other reasons, the user wishes to proceed manually rather than automatically, he elects to do so at the beginning of the evaluation (FIG. 3a). If the mode is manual, the type of image operation is then selected from a menu that includes "zoom", "brightness", "contrast", "histogram equalization", "draw lines", "measure angles", "measure distances", "edge enhancement", "pattern detect", "delete calculation (any from list)", "delete all calculations made so far", or "save calculations."

The "zoom" selection enables the user to select a portion of the image and expand that portion to the entire monitor so that the image of that portion is made larger. The CPU prompts for the amount of "zoom", or magnification, and the area of interest. These are stored in memory for further use. The zooming technique is a well-known numerical technique in other computer applications that enables closer examination of an area in question in the image of the X-ray and is performed by manipulating the bitmap. When the image is expanded, it occupies the full monitor screen but the bitmap does not have any more information than before.

"Brightness" and "contrast" are enhancements that are made to the bitmap to make it easier to discern the image and its features. Brightness is an operation on the binary values by which a fixed amount is added or subtracted to the values. Contrast is an operation where each value is multiplied by a fixed value, depending on the degree of contrast desired.

Histogram equalization is another enhancement technique applied to the bitmap. There are frequently areas of an X-ray that are substantially transparent or substantially opaque, and are, in fact essentially devoid of features or useful information. However, slight variations in the transparency or segments in these areas will affect the gray scale. Therefore, by enabling the user to select portions of the image that are of interest and thereby de-selecting portions that are not of interest because they are transparent or opaque, the gray scale is applied to only the selected portion and thus the bitmap will contain more information—the number of shades of gray will be spread over the less transparent and less opaque areas.

Analysis of a chiropractic X-ray begins with the identification of the features—vertebrae, for example—and, in particular, points on these features. The relationship of these features, as indicated by the distance from a point on one to a point on another and the angle and alignment of features tells the user something about the condition of the individual whose X-ray was taken. The CPU and the interface equipment—mouse, keyboard, monitor—enable the user to identify the points, mark and connect points with lines that overlay the image. "Marking" the image means to have sub-images assigned to the same locations or series of locations so that, on the face of the monitor, there appears to be a "dot" overlaying the location of a point of interest that has been identified, or a "line" connecting two "dots". Internal to CPU 20, the locations of these points are recorded for use but no modification of the binary-coded values takes place. In fact, the enhancements are performed using the binary-coded values and not with the CRT-displayable image. The CPU, instructed by the user, calculates distances and angles from the points and lines overlaying the image.

The CPU contains algorithms for detecting the edge of a feature. Essentially, the edge detection approach is a standard one that looks for a sudden change in intensity from one segment to the next. When a feature is somewhat rounded rather than sharp, its edge as it appears on the radiographic image will fade from lighter to darker as the radiation incident on it is scatted more and more to the side rather than backward. Thus, the locating of the edge becomes a relatively arbitrary decision and depends on selection criteria and sensitivity: the degree of change in intensity from one segment to the next that defines an edge. However, once the criteria are selected, the detection of edges becomes objective and impartial, no longer dependent on the user. Therefore, consistency from X-ray to X-ray and user to user is achieved, resulting in more uniform evaluations. The use of edge detection technique rather than the current pencil-and-ruler technique can reduce errors.

A library of patterns for the features can be stored in the memory for use in evaluating the features. The patterns includes reference images of another individual, whose identity is not disclosed and whose X-rays are available for comparison to the current X-ray to determine if a condition is present or absent, and if the individual is healthy or unhealthy. The patterns are stored in various magnifications to combine pattern recognition with the zoom feature.

The calculations and the marks on the image may be saved or not saved, or a portion of them deleted. The calculations are saved in temporary memory for a preselected amount of time, preferably a week; after that they are saved permanently and changes are inhibited to assure the integrity of the calculations.

It will be apparent to those skilled in the art that many changes and substitutions can be made to the preferred embodiment herein described without departing from the spirit and scope of the present invention as defined by the appended claims.

What is claimed is:

1. An apparatus for use in evaluating a radiograph, said radiograph being received by said apparatus in the form of series of data, said data carrying information descriptive of the features of a radiation-produced photograph, said apparatus comprising:

an electronic central processing unit:

means carried by said electronic central processing unit for displaying said series of data as a replica of said photograph;

first means for storing said series of data in said electronic central processing unit as a stored replica of said photograph so that said data cannot be modified;

means for making enhancements to said displayed replica;

second means for storing said enhancements, said second storage means storing said enhancements from said replica;

means for identifying features of said displayed replica without modifying said stored replica;

means for calculating relationships between said features; and means for producing an output containing a copy of said displayed replica.

2. The apparatus as recited in claim 1, wherein said producing means is a laser printer and said apparatus further comprises means for dithering said series of data so that said laser printer can produce a facsimile of said displayed replica.

3. The apparatus as recited in claim 1, wherein said displaying means is a monitor.

4. The apparatus as recited in claim 1, further comprising means for selecting a portion of said displayed replica and expanding said portion so that said displaying means is displaying only that portion and no other portion of said displayed replica.

5. The apparatus as recited in claim 1, further comprising means for detecting edges of said features to facilitate marking said features.

* * * * *